Oct. 5, 1948.  J. L. HIGHT  2,450,430
OXYGEN CONNECTION LOCKING MEMBER
Filed July 3, 1946

INVENTOR.
JAMES L. HIGHT
BY
HIS ATTORNEYS

Patented Oct. 5, 1948

2,450,430

UNITED STATES PATENT OFFICE 2,450,430

OXYGEN CONNECTION LOCKING MEMBER

James L. Hight, Dayton, Ohio

Application July 3, 1946, Serial No. 681,276

4 Claims. (Cl. 285—173)

(Granted under the act of March 3, 1883, as amended April 30, 1928; 370 O. G. 757)

The invention described herein may be manufactured and used by or for the Government for governmental purposes without payment to me of any royalty thereon.

This invention relates to locking means for oxygen hose connections for oxygen masks, used by personnel in aircraft or the like.

The standard low pressure oxygen mask is provided with a connection consisting of flexible metal tongues forming an extension of the mask hose. These tongues are embossed to form a grasping ring at the end thereof and are arranged to snap into an annular recess in a mating member attached to the end of a supply hose. The end of the supply hose is normally provided with a spring pressed flap which is pivoted at one side thereof and swings shut when the supply hose is not in use so as to close the open end thereof and prevent dirt and foreign material from entering. This flap is normally circular in shape and of a somewhat larger diameter than the end of the hose connections so as to form a smooth and complete closure. It is provided with extending arms which are pivotally mounted on a pin. There is normally a space bounded by the body of the closure and the pivot arms and pin. It has heretofore been the custom to insert the flexible tongues of the mask hose extension into the mating member of the supply hose and rely upon the spring of the tongues in the embossed portions fitting into the annular recess of the supply hose member to form a reasonably tight joint and hold the connection together. Experience has shown that this is not adequate in most cases. This results from a number of causes, among which a few may be noted. The tongue springs are frequently bent out of circular alignment so that their spring action may be impaired and prevent a firm grasp of the walls of the annular recess mentioned above. They may become corroded and not fit well, or the annular recess itself may become worn and thus lose its firm gripping action. Again, where the mask is mass produced, it has sometimes been found that the sealing washer is positioned in such a manner that it will not permit the flexible tongues to completely and firmly grasp the walls in the recess of the mating member of the supply hose.

Accordingly, it is an object of this invention to provide a locking member which will prevent the flexible tongues of the mask hose from pulling out of the mating member in the supply hose except when such withdrawal is desired by the personnel wearing the oxygen mask.

It is a further object of this invention to provide a locking member which may readily be adapted to the present quick-disconnect oxygen hose connections without any change of the design thereof.

It is a still further object of this invention to provide on a quick-disconnect oxygen hose connection a female socket member provided with a latch having an aperture therein which engages an extending portion of a locking member secured to the male connection member whereby the two connection members are securely locked together and cannot accidentally become disengaged.

These and other objects of my invention will become apparent from the following detailed description taken in conjunction with the accompanying drawing in which.

Figure 1:
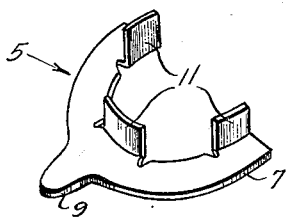
Fig. 1 is a perspective view of the locking member.
Figure 2:
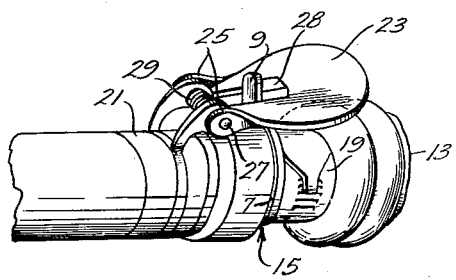
Fig. 2 is a perspective view of the locking member assembled with an oxygen connection of the character described.
Figure 3:
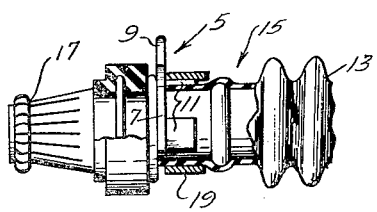
Fig. 3 is a side view of the male connection member with the locking member attached.

The locking member 5 is an integral structure which may be blanked out and formed by dies or assembled from two separate pieces where it is desired to utilize materials of different characters. Locking member 5 comprises a U-shaped body portion 7 with an outwardly extending lug 9 projecting from the closed end of the U. Three fingers 11 project perpendicularly from the plane of the body portion 7 around the inner edge thereof. One finger is at each end of the U and one at the middle thereof opposite lug 9. Fingers 11 may be integral with body member 7 or may be made of spring steel or the like and welded thereto.

The locking member 5 operates on a standard oxygen mask in the following manner: mask hose 13 terminates in a metal coupling 15 having embossed flexible tongues 17 on the end thereof. The locking element 5 is fitted over the coupling 15 with its fingers 11 inserted over the rubber mask hose 13 and under a locking band 19 which when tightened grips it firmly and holds lug 9 in an upright position.

When tongues 17 are now inserted in oxygen supply hose connection member 21 it will be seen that lug 9 extends upwardly, adjacent supply hose latch 23 which is provided with projecting arms 25 and pivoted on pin 27. The body of latch 23, arms 25, and pivot pin 27 bound an aperture through which lug 9 projects and rests against the edge of latch 23. This edge may be enlarged somewhat as at 28 to give a greater bearing surface. Spring 29 urges the latch 23 into a closed position over the end of supply hose connection member 21 at all times and thus insures that the bearing surface formed by enlarged portion 28 rests firmly against lug 9 when the connection is complete. Since the locking member 5 is held in place by locking band 19, it will readily appear that the two portions of the oxygen connection, one attached to the end of the mask hose 13 and the other attached to the end of the supply hose, are held together and cannot be separated.

When it is desired to break the connection, it is merely necessary to raise latch 23 so that the bearing surface formed by the enlarged portion 28 clears lug 9. The flexible tongues 17 are then withdrawn from supply hose member 21, and the connection is broken. Latch 23 then closes over the end of member 21 under the action of spring 29 and prevents dust and dirt from getting into the supply hose.

While I have described one particular embodiment of my invention, it is to be understood that I do not wish to be restricted thereto and that I intend to cover all modifications thereof which would be apparent to one skilled in the art and which come within the spirit and scope of the appended claims.

I claim:

1. In a standard low pressure oxygen mask, a hose connection comprising a male connection member attached to a mask hose and a female mating member attached to the end of the supply hose, a spring pressed latch provided on said female mating member which is pivoted at one side thereof and provided with extending arms which are pivotally mounted on a pin forming an aperture bounded by said latch, said latch arms, and said pin, a generally U-shaped locking member secured to said mask hose, a projecting element on said locking member adapted to fit in said latch aperture, a bearing surface on said latch which bears against said projecting element of said locking member under the action of said latch spring whereby said connection members are positively locked in a coupled position.

2. In a quick-disconnect oxygen hose connection comprising male and female connecting members, a generally U-shaped locking member, fingers extending perpendicularly from the body of said locking member, said locking member secured to a male connection member by means of a locking band which grips said locking member fingers, a lug provided on said locking member extending outwardly from the closed end of said locking member and in the plane of the body thereof, a spring pressed latch provided on the female connection member which is pivoted at one side thereof and with extending arms which are pivotally mounted on a pin supported by said female connection member, an aperture bounded by said latch, said latch arms and said pin, said locking member lug adapted to fit into said aperture and to bear against the edge of said latch, said latch spring adapted to hold said latch in position against said lug whereby said oxygen hose connection is positively locked in a coupled position.

3. In a quick-disconnect oxygen hose connection comprising male and female connecting members, a generally U-shaped locking member, fingers extending perpendicularly from the body of said locking member, said locking member secured to a male connection member by means of a locking band which grips said locking member fingers, a lug provided on said locking member extending outwardly from the closed end of said locking member and in the plane of the body thereof, a spring pressed latch provided on the female connection member which is pivoted at one side thereof and with extending arms which are pivotally mounted on a pin supported by said female connection member, an aperture bounded by said latch, said latch arms and said pin, said locking member lug adapted to fit into said aperture and to bear against the edge of said latch, said locking member lug adapted to become disengaged from said latch aperture when said latch is manually raised to an upright position whereby said oxygen hose connection may be manually disconnected.

4. A locking member for a hose joint, said member comprising a flat semicircular body portion, a plurality of fingers bent in one direction at right angles to the body portion at the inner edge thereof and an outwardly extending lug projecting from the closed end of the body portion and integral with the latter.

JAMES L. HIGHT.

REFERENCES CITED

The following references are of record in the file of this patent:

UNITED STATES PATENTS

| Number | Name | Date |
|---|---|---|
| 193,078 | Eames | July 17, 1877 |
| 1,150,420 | Davis et al. | Aug. 17, 1915 |
| 2,251,651 | Ames | Aug. 5, 1941 |